(12) United States Patent
Komatsu et al.

(10) Patent No.: US 9,517,717 B2
(45) Date of Patent: Dec. 13, 2016

(54) AUTOMOTIVE LAMP

(71) Applicant: Koito Manufacturing Co., Ltd., Minato-ku (JP)

(72) Inventors: Motohiro Komatsu, Shizuoka (JP); Naoki Uchida, Shizuoka (JP); Takeshi Masuda, Shizuoka (JP); Yuji Yasuda, Shizuoka (JP); Mitsuyuki Mochizuki, Shizuoka (JP); Hidetada Tanaka, Shizuoka (JP)

(73) Assignee: KOITO MANUFACTURING CO., LTD., Minato-Ku, Tokyo (JP)

(*) Notice: Subject to any disclaimer, the term of this patent is extended or adjusted under 35 U.S.C. 154(b) by 0 days.

(21) Appl. No.: 14/605,181

(22) Filed: Jan. 26, 2015

(65) Prior Publication Data

US 2015/0137680 A1 May 21, 2015

Related U.S. Application Data

(63) Continuation of application No. PCT/JP2013/004385, filed on Jul. 18, 2013.

(30) Foreign Application Priority Data

Aug. 8, 2012 (JP) .................................. 2012-175680

(51) Int. Cl.
*B60Q 1/14* (2006.01)
*B60Q 1/00* (2006.01)
(Continued)

(52) U.S. Cl.
CPC ........... *B60Q 1/1423* (2013.01); *B60Q 1/0023* (2013.01); *B60Q 1/143* (2013.01); *B60Q 1/245* (2013.01);
(Continued)

(58) Field of Classification Search
CPC .......... G08G 1/166; G08G 1/16; G08G 1/165; B60Q 2300/45; B60Q 1/0023; B60Q 1/085; B60Q 1/06; B60Q 1/1423; B60Q 1/143; B60Q 3/046; B60Q 2300/056; B60Q 2300/3321; B60Q 2300/41; B60Q 2300/42; G06K 9/00805; B60R 19/483
See application file for complete search history.

(56) References Cited

U.S. PATENT DOCUMENTS 5,831,717 A * 11/1998 Ikebuchi ................. G01S 7/484
                                                                   180/169
6,169,478 B1 * 1/2001 Hada ......................... B60T 7/22
                                                                   340/435
(Continued)

FOREIGN PATENT DOCUMENTS

CN 101423040 A 5/2009
CN 102592442 A 7/2012
(Continued)

OTHER PUBLICATIONS

International Preliminary Report on Patentability(PCT/IB/373) and the Written Opinion of the Searching Authority (Form PCT/ISA/237) issued on Feb. 15, 2015, by the International Bureau of WIPO in corresponding International Application No. PCT/JP2013/004385. (9 pages).

(Continued)

*Primary Examiner* — Vibol Tan
(74) *Attorney, Agent, or Firm* — Buchanan Ingersoll & Rooney PC

(57) ABSTRACT

A light emitting lamp according to one embodiment of the present invention includes a laser light source, a scanning unit, which scans the laser light emitted from the laser light source so as to form a visible light distribution pattern, an obstacle detector, which detects an obstacle, if any, in front (Continued)

of a driver's vehicle, and a control unit, which adjusts the intensity of the laser light irradiated to an obstacle existent region, according to the distance from the driver's vehicle to the obstacle, based on the detection result of the obstacle detector.

3 Claims, 9 Drawing Sheets

(51) Int. Cl.
    *B60Q 1/24*     (2006.01)
    *B60Q 11/00*     (2006.01)
    *F21S 8/10*     (2006.01)

(52) U.S. Cl.
    CPC .......... *B60Q 11/005* (2013.01); *F21S 48/1136* (2013.01); *F21S 48/1154* (2013.01); *F21S 48/1323* (2013.01); *F21S 48/1388* (2013.01); *F21S 48/1747* (2013.01); *F21S 48/1757* (2013.01); *B60Q 2300/45* (2013.01)

(56) References Cited

U.S. PATENT DOCUMENTS

| | | | | |
|---|---|---|---|---|
| 7,166,841 | B2* | 1/2007 | Satou | G01S 7/51 250/336.1 |
| 7,415,338 | B2* | 8/2008 | Monji | B60Q 1/085 250/208.4 |
| 8,862,336 | B2* | 10/2014 | Dierks | B60Q 1/143 362/466 |
| 9,045,080 | B2* | 6/2015 | Yamamura | B60Q 1/0023 |
| 2012/0287493 | A1* | 11/2012 | Kuhlman | B60Q 1/085 359/228 |
| 2013/0258688 | A1* | 10/2013 | Kalapodas | B60Q 1/085 362/465 |
| 2014/0265980 | A1* | 9/2014 | Kracker | G06K 9/00791 318/483 |

FOREIGN PATENT DOCUMENTS

| | | | | |
|---|---|---|---|---|
| JP | 08142743 A | * | 6/1996 | ............... B60Q 1/02 |
| JP | 3995561 B2 | | 8/2007 | |
| JP | 2009-048786 A | | 3/2009 | |
| JP | 2010-163141 A | | 7/2010 | |
| JP | 2011-129375 A | | 6/2011 | |
| JP | 2011-157022 A | | 8/2011 | |
| JP | 2011157022 A | * | 8/2011 | ............... B60Q 1/04 |

OTHER PUBLICATIONS

International Search Report (PCT/ISA/210) issued on Sep. 17, 2013 in corresponding International Application No. PCT/JP2013/004385. (2 pages).

First Office Action dated Feb. 2, 2016 issued in the corresponding Chinese Patent Application No. 201380041590.6 and English translation (14 pages).

Chinese Office Action dated Sep. 27, 2016 issued in corresponding Chinese Patent Appln. No. 201380041590.6, with English translation (14 pages).

* cited by examiner

AUTOMOTIVE LAMP

BACKGROUND OF THE INVENTION

1. Field of the Invention

The present invention relates to an automotive lamp, and more particularly to an automotive lamp used for a vehicle such as an automobile.

2. Description of the Related Art

Reference (1) listed in the following Related Art Documents discloses an automotive lamp comprised of a semiconductor laser, which emits laser light, and a light-emitting section, which contains fluorescent material (phosphors) therein and which emits light upon receiving the laser light. This automotive headlamp irradiates laser light (blue-violet color) whose wavelength is 405 nm. A luminous body is a silicone resin containing blue, green and red phosphors, and produces white light when it receives blue-violet laser light. The white light produced by the phosphors is irradiated by a reflecting mirror toward a front area of the lamp.

RELATED ART DOCUMENTS (1) Japanese Unexamined Patent Application Publication No. 2011-129375.

The automotive lamp has a function of improving the visibility of a driver of a vehicle by irradiating a front area of the vehicle with light emitted from the lamp. However, it is always required of the automotive lamp such that the visibility of the driver of the vehicle be improved for the pedestrians, fallen objects, buildings and so forth present in front of his/her own driving vehicle and that the performance thereof be improved by, for example, reducing glare as experienced by other drivers. Such demands also apply to the automotive lamps using the laser light source.

SUMMARY OF THE INVENTION

The present invention has been made to solve the above-described problems, and a purpose thereof is to provide a technology that helps improve the performance of automotive lamps.

To resolve the foregoing problems, one embodiment of the present invention relates to an automotive lamp. The automotive lamp includes: a laser light source; a scanning unit that scans laser light emitted from the laser light source and forms a visible light distribution pattern; an obstacle detector that detects an obstacle in front of a driver's vehicle; and a control unit that adjusts intensity of the laser light irradiated to a region, where the obstacle is existent, based on a detection result of the obstacle detector.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
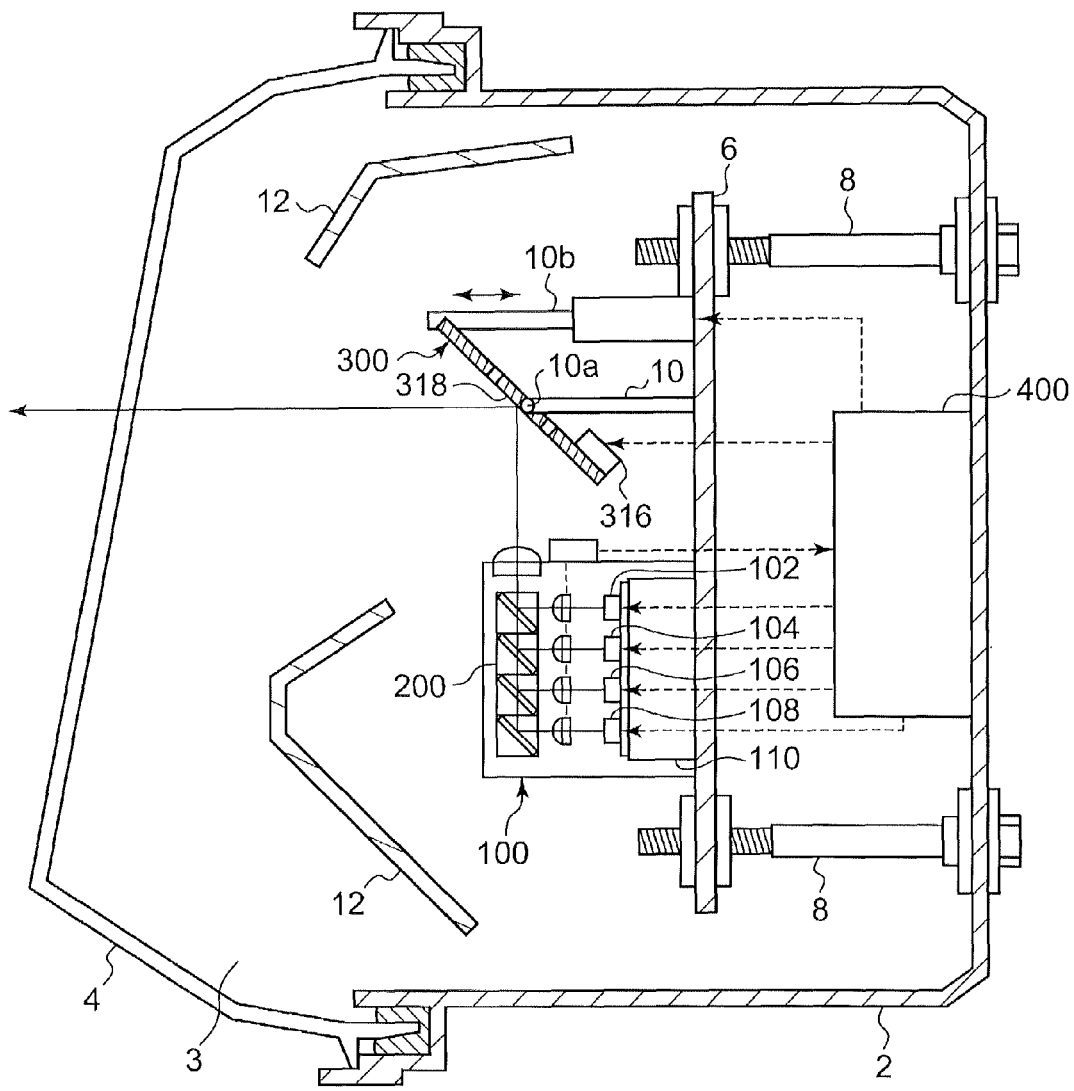
FIG. 1 is a vertical cross-sectional view schematically showing a structure of an automotive lamp according to a first embodiment of the present invention.

One embodiment of the present invention relates to an automotive lamp. This automotive lamp includes: a laser light source; a scanning unit that scans laser light emitted from the laser light source and forms a visible light distribution pattern; an obstacle detector that detects an obstacle in front of a driver's vehicle; and a control unit that adjusts intensity of the laser light irradiated to a region, where the obstacle is existent, based on a detection result of the obstacle detector.

This embodiment can improve the visibility of a driver of his/her own vehicle for the pedestrians and foreign substances present, if any, in a forward direction of his/her driving vehicle and can reduce glare as experienced by other drivers. Hence, the performance of the automotive lamps can be improved.

In the above-described embodiment, the obstacle detector may have an infrared light source and an infrared light detector, and the scanning unit may scan the laser light and infrared light emitted from the infrared light source. By employing this embodiment, provision of such an obstacle detector can suppress the increase in the manufacturing cost and the number of components required by the automotive lamp and also can prevent the automotive lamp from becoming larger in size.

In any of the above-described embodiments, the control unit may perform control such that the intensity of the laser light irradiated to a periphery of the visible light distribution pattern is reduced over the intensity thereof irradiated to a central part of the visible light distribution pattern. This embodiment eases the variation in illuminance at light-dark boundary lines of the visible light distribution pattern, so that a visual sense of discomfort as experienced by a driver of his/her own vehicle, other drivers and/or pedestrians can be reduced.

Optional combinations of the aforementioned constituting elements, and implementations of the invention in the form of methods, apparatuses, systems and so forth may also be practiced as additional modes of the present invention.

Hereinafter, the present invention will be described based on preferred embodiments with reference to the accompanying drawings. The identical or equivalent constituents, members, or processes illustrated in each drawing will be denoted with the identical reference numerals, and the repeated description thereof will be omitted as appropriate. The preferred embodiments do not intend to limit the scope of the invention but exemplify the invention. All of the features and the combinations thereof described in the embodiments are not necessarily essential to the invention.

First Embodiment

FIG. 1 is a vertical cross-sectional view schematically showing a structure of an automotive lamp 1 according to a first embodiment. In FIG. 1, a light source unit 100 is shown in a state where the interior thereof is seen through. Also, permanent magnets 312 and 314 of a scanning unit 300 are omitted in FIG. 1. The automotive lamp according to the present embodiment is, for instance, an automotive headlamp apparatus that has a pair of headlamp units placed in left- and right-side front parts of a vehicle. Since the pair of headlamp units are of practically identical structure to each other, FIG. 1 shows the structure of either one of the left and right headlamp units, as the automotive lamp 1.

An automotive lamp 1 includes a lamp body 2, having an opening on a frontward side of the vehicle, and a transparent cover 4, which covers the opening of the lamp body 2. The transparent cover 4 is formed of resin or glass having translucency, for instance. A lamp chamber 3, which is formed by the lamp body 2 and the transparent cover 4, contains a supporting plate 6, a light source unit 100, a scanning unit 300, and a control unit 400.

The light source unit 100 and the scanning unit 300 are supported by the supporting plate 6 at predetermined positions in the lamp chamber 3. The supporting plate 6 is connected to the lamp body 2 by aiming screws 8 at corners of the supporting plate 6. The light source unit 100 has a first laser light source 102, a second laser light source 104, a third laser light source 106, a fourth laser light source 108, a heatsink 110, a light condensing unit 200, and so forth. The light source unit 100 is fixed in front of the supporting plate 6 such that the heatsink 110 is in contact with the supporting plate 6. A detailed description will be given later of the internal structure of the light source unit 100.

The scanning unit 300 has a reflector 318. The structure of the scanning unit 300 will be discussed later in detail. The scanning unit 300 is positioned relative to the light source unit 100 in a predetermined manner such that laser light emitted from the light source unit 100 is reflected in a frontward direction of the lamp. And the scanning unit 300 is secured to a protrusion 10 that protrudes on a frontward side of the lamp from the front surface of the supporting plate 6. The protrusion 10 has a pivot mechanism 10a, and the scanning unit 300 is supported by the protrusion 10 via the pivot mechanism 10a. Also, the protrusion 10 has a rod and a supporting actuator 10b, having a motor by which to elongate and contract this rod in the longitudinal directions of the lamp. The tip of the rod is connected to the scanning unit 300. The protrusion 10 enables the scanning unit 300 to make a swing motion by having the rod elongate and contract with the pivot mechanism 10a functioning as a shaft. This can adjust the inclination angle (pitch angle) of the scanning unit 300 in the vertical direction. The supporting actuator 10b is connected to the control unit 400, and the drive of the supporting actuator 10b is controlled by an actuator control unit 408 (see FIG. 5), which will be described later, in the control unit 400. The control unit 400 is secured to the lamp body 2 such that the control unit 400 is located behind the supporting plate 6 toward the rear end of the lamp. Note that the position where the control unit 400 is provided is not particularly limited to this position.

The automotive lamp 1 is configured such that the light axis of the automotive lamp 1 is adjustable in the horizontal and vertical directions. More specifically, adjusting the position (posture) of the supporting plate 6 by rotating the aiming screws 8 allows the light axis thereof to be adjusted in the horizontal and vertical directions. An extension reflector 12, having an opening that allows the light reflected by the scanning unit 300 to travel toward a front area of the lamp, is provided in a frontward side of the light source unit 100 and the scanning unit 300 in the lamp chamber 3. A detailed description is given hereunder of each component that constitutes the automotive lamp 1.

(Light Source Unit)

Figure 2:
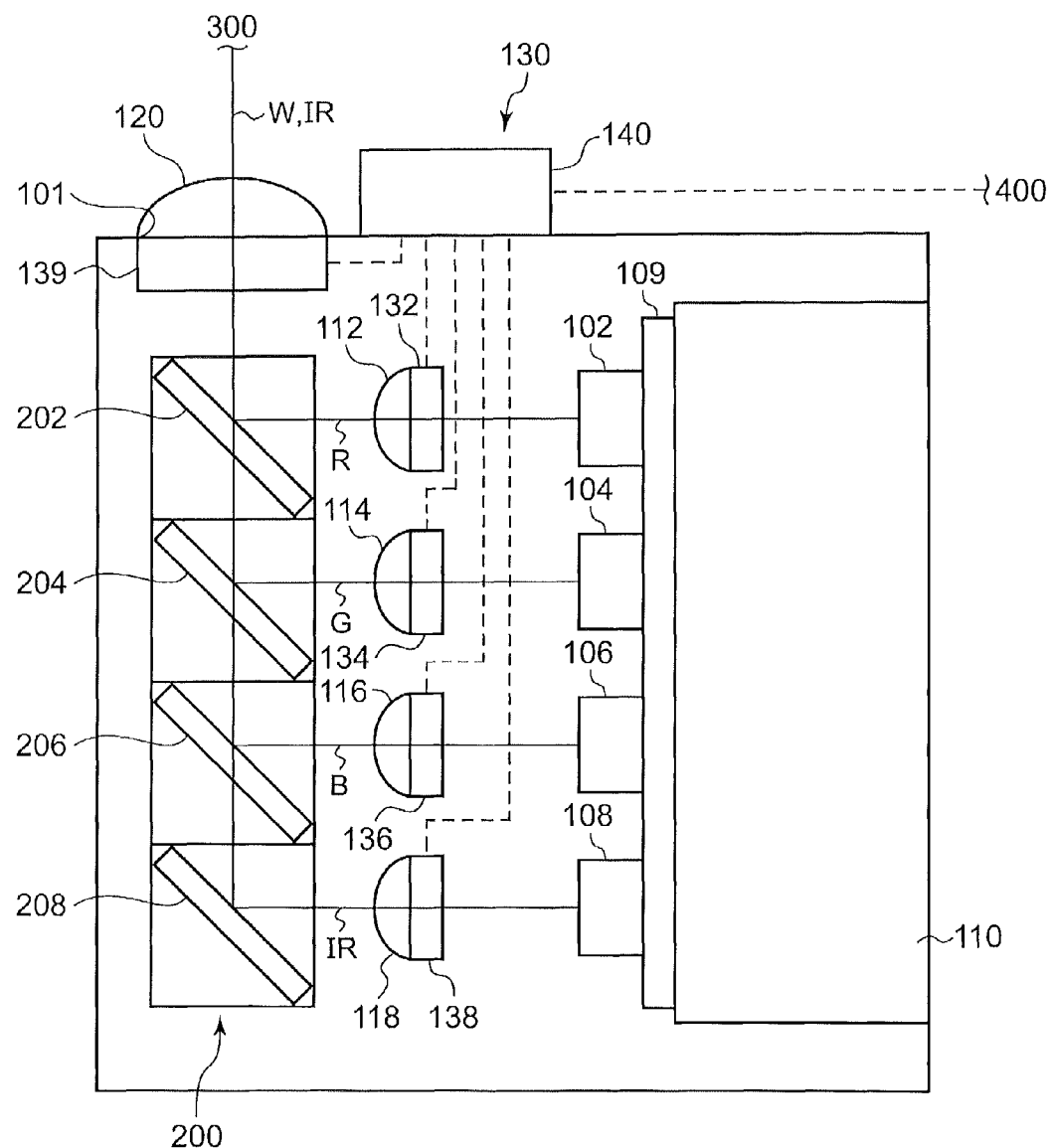
FIG. 2 is a side view schematically showing a structure of a light source unit.

FIG. 2 is a side view schematically showing a structure of the light source unit. Note that FIG. 2 is a transparent view showing the interior of the light source unit 100. The light source unit 100 has a first laser light source 102, a second laser light source 104, a third laser light source 106, a fourth laser light source 108, a heatsink 110, a first lens 112, a second lens 114, a third lens 116, a fourth lens 118, a fifth lens 120, a light condensing unit 200, and other components.

The first laser light source 102, which is constituted by a red laser diode, emits red laser light R. The second laser light source 104, which is constituted by a green laser diode, omits green laser light G. The third laser light source 106, which is constituted by a blue laser diode, emits blue laser light B. The fourth laser light source 108 (infrared light source), which is constituted by an infrared laser diode, emits infrared laser light IR (infrared light). The first laser light source 102 to the fourth laser light source 108 are mounted on a common substrate 109. Each light source may have a laser device other than the laser diode. Also, the infrared light source may be a light source other than the laser light sources.

The first laser light source 102, the second laser light source 104, the third laser light source 106 and the fourth laser light source 108 are arranged such that their respective laser light emission surfaces face a front area of the lamp and the substrate 109 faces a rear area of the lamp. Also, the first to fourth laser light sources 102, 104, 106 and 108 are mounted on a surface of the heatsink 110 that faces a front area of the lamp. The heatsink 110 is formed of a material, having a high thermal conductivity, such as aluminum, for the purpose of efficiently recovering the heat produced by each laser light source. A rear-side surface of the heatsink 110 is in contact with the supporting plate 6 (see FIG. 1). The heat produced by each laser light source is radiated through the substrate 109, the heatsink 110 and the supporting plate 6.

The first lens 112, the second lens 114, the third lens 116, the fourth lens 118 and the fifth lens 120 are each a collimator lens, for instance. The first lens 112 is provided on a light path of the red laser light R between the first laser light source 102 and the light condensing unit 200, and converts the red laser light R, emitted from the first laser light source 102 toward the light condensing unit 200, into parallel light. The second lens 114 is provided on a light path of the green laser light G between the second laser light source 104 and the light condensing unit 200, and converts the green laser light G, emitted from the second laser light source 104 toward the light condensing unit 200, into parallel light. The third lens 116 is provided on a light path of the blue laser light B between the third laser light source 106 and the light condensing unit 200, and converts the blue laser light B, emitted from the third laser light source 106 toward the light condensing unit 200, into parallel light.

The fourth lens 118 is provided on a light path of the infrared laser light IR between the fourth laser light source 108 and the light condensing unit 200, and converts the infrared laser light IR, emitted from the fourth laser light source 108 toward the light condensing unit 200, into parallel light. The fifth lens 120 is fitted to an opening 101 provided in a housing of the light source unit 100. The fifth lens 120 is provided on a light path of white laser light W (discussed later) and the infrared laser light IR between the light condensing unit 200 and the scanning unit 300 (see FIG. 1). The fifth lens 120 converts the white laser light W and the infrared laser light IR, emitted from the light condensing unit 200 toward the scanning unit 300, into parallel light.

The light condensing unit 200 collects the red laser light R, the green laser light G and the blue laser light B so as to generate the white laser light W. Also, the light condensing unit 200 collects the infrared laser light IR on the white laser light W. The light condensing unit 200 has a first dichroic mirror 202, a second dichroic mirror 204, a third dichroic mirror 206 and a fourth dichroic mirror 208.

The first dichroic mirror 202 is a mirror that reflects at least the red light and transmits the blue light, the green light and the infrared light, and is arranged such it reflects the red laser light R, which has passed through the first lens 112, toward the fifth lens 120. The second dichroic mirror 204 is a mirror that reflects at least the green light and transmits the blue light and the infrared light, and is arranged such it reflects the green laser light G, which has passed through the second lens 114, toward the fifth lens 120. The third dichroic mirror 206 is a mirror that reflects at least the blue light and transmits the infrared light, and is arranged such it reflects the blue laser light B, which has passed through the third lens 116, toward the fifth lens 120. The fourth dichroic mirror 208 is a mirror that reflects at least the infrared light, and is arranged such it reflects the infrared laser light IR, which has passed through the fourth lens 118, toward the fifth lens 120.

A mutual positional relation among the dichroic mirrors 202 to 208 is determined such that the light paths of the laser lights reflected by the dichroic mirrors 202 to 208 are parallel to each other and such that their respective laser lights are collected and the thus collected light enters the fifth lens 120. In the present embodiment, the first dichroic mirror 202 to the fourth dichroic mirror 208 are arranged such that the areas where the laser lights strike on the respective dichroic mirrors, namely the reflecting points of laser lights, are aligned on a same line.

The infrared light IR emitted from the fourth laser light source 108 is reflected by the fourth dichroic mirror 208 and then travels toward the third dichroic mirror 206. The blue laser light B emitted from the third laser light source 106 is reflected by the third dichroic mirror 206 and then travels toward the second dichroic mirror 204 and, at the same time, the thus reflected light is superposed on the infrared laser light IR that has transmitted the third dichroic mirror 206. The green laser light G emitted from the second laser light source 104 is reflected by the second dichroic mirror 204 toward the first dichroic mirror 202 and, at the same time, the thus reflected light is superposed on the aggregate light of the infrared laser light IR and the blue laser light B, which have transmitted the second dichroic mirror 204. The red laser light R emitted from the first laser light source 102 is reflected by the first dichroic mirror 202 toward the fifth lens 120 and, at the same time, the thus reflected light is superposed on the aggregate light of the infrared laser light IR, the blue laser light B and the green laser light G, which have transmitted the first dichroic mirror 202. As a result, the white laser light W containing the infrared light IR is formed. A mixed laser light of the infrared laser light IR and the white laser light W passes through the fifth lens 120 and travels toward the scanning unit 300.

The light source unit 100 has a monitoring unit 130 that monitors the emission of each laser light. The monitoring unit 130 has a first photosensor 132, a second photosensor 134, a third photosensor 136, a fourth photosensor 138, a fifth photosensor 139, and an abnormality determining unit 140. The first photosensor 132 measures the intensity of the red laser light R. The second photosensor 134 measures the intensity of the green laser light G. The third photosensor 136 measures the intensity of the blue laser light B. The fourth photosensor 138 measures the intensity of the infrared light IR. The fifth photosensor 139 measures the intensity of the aggregate light of the white laser light W and the infrared laser light IR. Each photosensors transmits a signal indicative of a measured value to the abnormality determining unit 140.

The abnormality determining unit 140 compares the measured values of the first photosensor 132 to the fourth photosensor 138 against a preset range of irradiation intensities and thereby determines whether or not any abnormality occurs in the emission of laser light at each light source. Also, the abnormality determining unit 140 uses the measured value of the fifth photosensor 139 to determine whether or not the intensity of the white laser light W or the intensity of the aggregate light of the white laser light W and the infrared laser light IR is contained in a preset range thereof. The abnormality determining unit 140 can calculate the intensity of the white laser light W by subtracting the measured value at the fourth photosensor 138 from that at the fifth photosensor 139. The abnormality determining unit 140 transmits a signal indicating a determination result to the control unit 400. It is to be noted that the abnormality determining unit 140 may be provided inside the control unit 400 instead.

(Scanning Unit)

Figure 3:
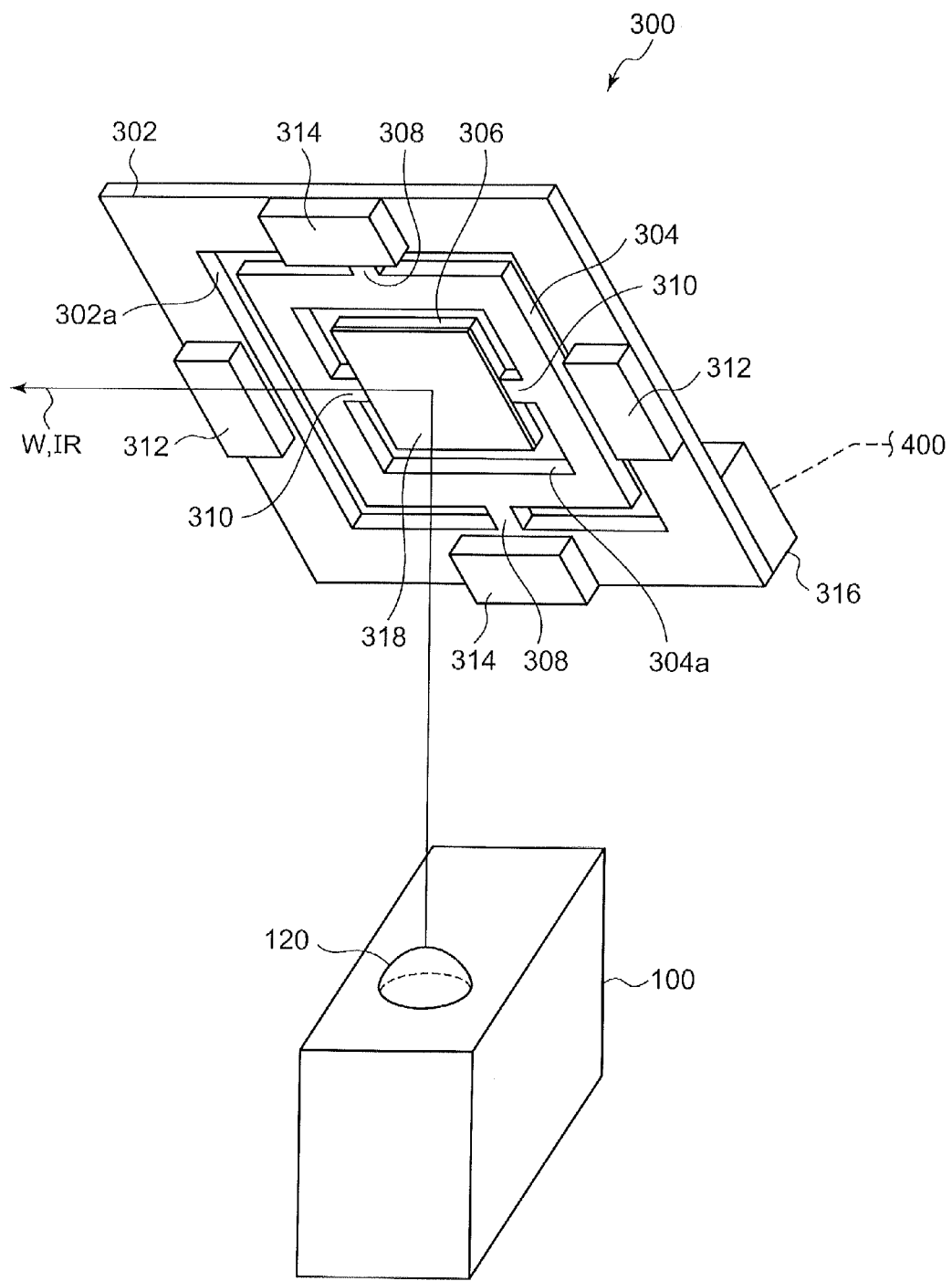
FIG. 3 is a schematic perspective view of a scanning unit as observed from a front side of a lamp.

FIG. 3 is a schematic perspective view of a scanning unit as observed from a front side of the lamp. The scanning unit 300 is a mechanism used to scan the laser lights, emitted from the first laser light source 102 to the third laser light source 106, and form a predetermined visible light distribution pattern (see FIG. 4). The scanning unit 300 scans a front area of the vehicle with the infrared laser light IR. The scanning unit 300, which is configured by a so-called galvanometer mirror, for instance, includes a base 302, a first rotating body 304, a second rotating body 306, first torsion bars 308, second torsion bars 310, permanent magnets 312 and 314, a terminal part 316, a reflector 318, and so forth. The base 302 is a frame body having an opening 302a in the center, and is secured to the tip of the protrusion 10 (see FIG. 1) such that the base 302 is tilted in the back and forth directions of the lamp. The terminal part 316 is provided in a predetermined position of the base 302. The first rotating body 304 is arranged in the opening 302a of the base 302. The first rotating body 304 is a frame body having an opening 304a in the center, and is turnably supported by the first torsion bars 308, which extend from a rear lower side to a frontal upper side of the lamp, laterally (in the vehicle width direction) in relation to the base 302.

The second rotating body 306 is arranged in an opening 304a of the first rotating body 304. The second rotating body 306 is a rectangular plate, and is turnably supported by the second torsion bars 310, which extend in the vehicle width direction, vertically in relation to the first rotating body 304. When the first rotating body 304 is turned laterally with the first torsion bars 308 as a turning shaft, the second rotating body 306 is turned laterally together with the first rotating body 304. The reflector 318 is provided on the surface of the second rotating body 306 by use of a plating, vapor deposition or like method.

A pair of permanent magnets 312 are provided on the base 302 in a position orthogonal to the direction along which the first torsion bars 308 extend. The permanent magnets 312 form a magnetic field running orthogonal to the first torsion bars 308. A first coil (not shown) is wired in the first rotating body 304, and the first coil is connected to the control unit 400 via the terminal part 316. Also, a pair of permanent magnets 314 are provided on the base 302 in a position orthogonal to the direction along which the second torsion bars 310 extend. The permanent magnets 314 form a magnetic field running orthogonal to the second torsion bars 310. A second coil (not shown) is wired in the second rotating body 306, and the second coil is connected to the control unit 400 via the terminal part 316.

Figure 5:
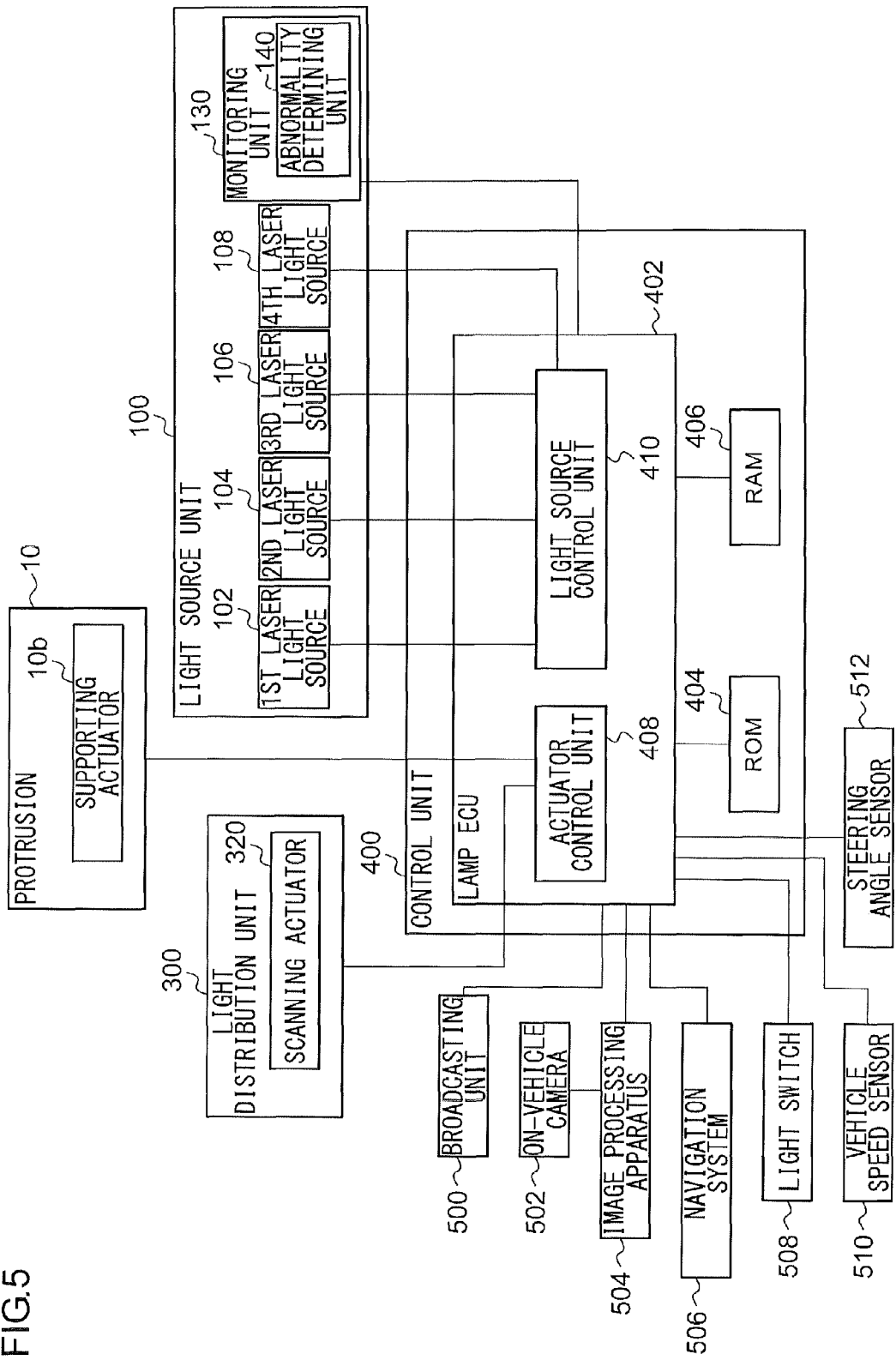
FIG. 5 is a functional block diagram for explaining a control unit.

The first coil and the permanent magnets 312, and the second coil and the permanent magnets 314 constitute a scanning actuator 320 (see FIG. 5). The drive of the scanning actuator 320 is controlled by an actuator control unit 408 (see FIG. 5) described later. The actuator control unit 408 controls the amount and the direction of electric current flowing through the first coil and the second coil. Controlling the amount and the direction of electric voltage flowing therethrough enables the first rotating body 304 and the second rotating body 306 to turnably reciprocate from side to side (laterally) and enables the second rotating body 306 to turnably reciprocate vertically independently. As a result, the reflector 318 makes turnably reciprocating movements in vertical and lateral directions. Also, controlling the amount of electric voltage flowing therethrough regulates the width (amplitude) in the turnably reciprocating movement of the second of the second rotating body 306.

A mutual positional relation between the light source unit 100 and the scanning unit 300 is determined such that the white laser light W and the infrared laser light IR emitted from the light source unit 100 are reflected by the reflector 318 toward a front area of the lamp. Then the scanning unit 300 scans a front area of the vehicle using the white laser light W and the infrared laser light IR by the turnably reciprocating the reflector 318. For example, the scanning unit 300 turns the reflector 318 over a scanning range that is wider than a region where the light distribution pattern is formed. Then the light source control unit 410 (see FIG. 5) in the control unit 400 turns on the first laser light source 102 to the third laser light source 106 when the turning position of the reflector 318 is in a position corresponding to the region of the visible light distribution pattern. Thereby, the white laser light W is distributed over the region where the visible light distribution pattern is formed and, as a result, a predetermined visible light distribution pattern is formed in the front area of the vehicle. In this case, the light source control unit 410 constitutes part of the scanning unit 300. For example, the light source control unit 410 constantly turns on the fourth laser light source 108. This allows entire turning range (scan area) of the reflector 318 to be scanned with the infrared laser light IR. The infrared laser light IR is used for the detection of an obstacle (described later).

Figure 4:
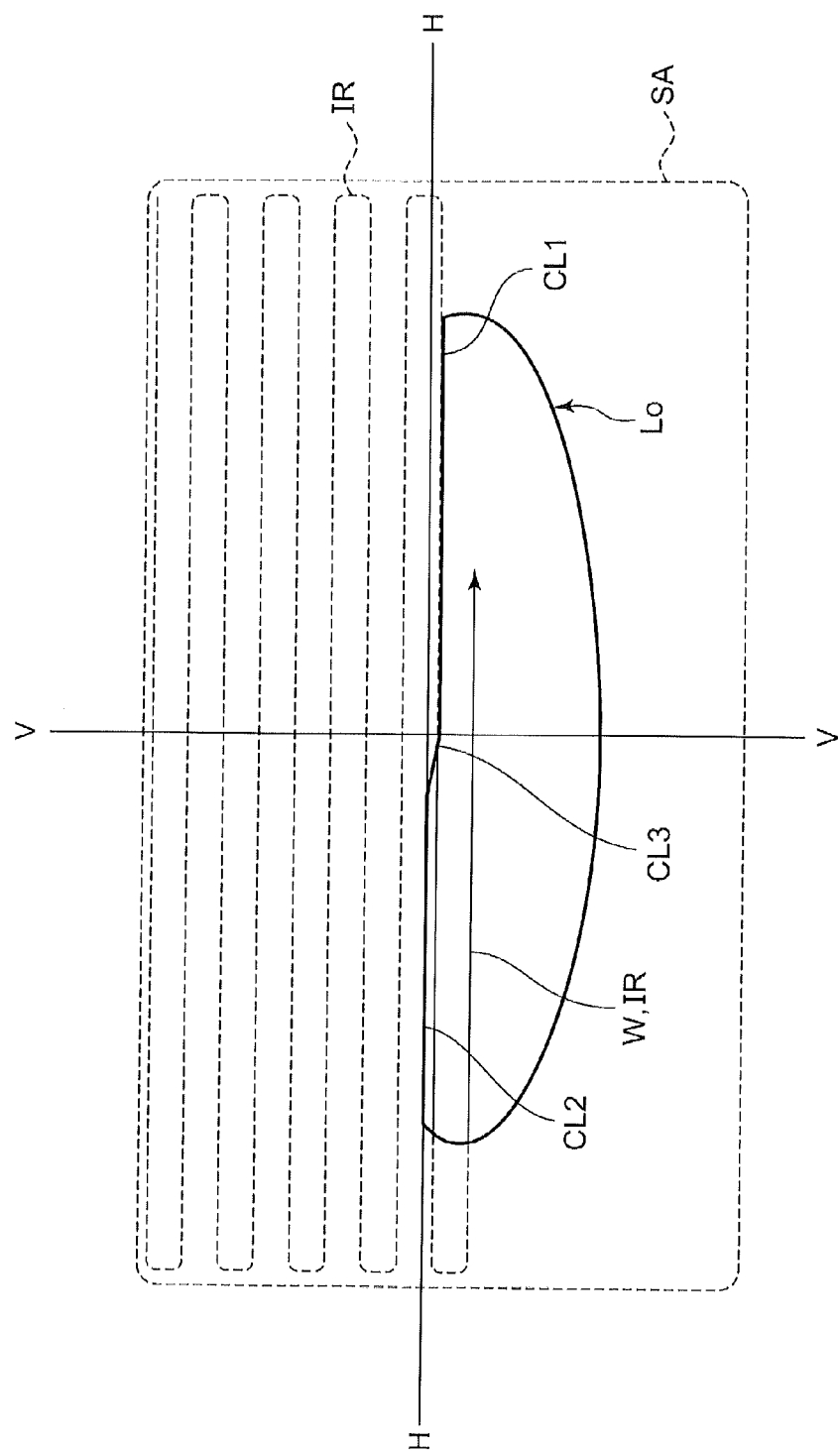
FIG. 4 shows a visible light distribution pattern formed by an automotive lamp according to a first embodiment.

FIG. 4 shows an exemplary visible light distribution pattern formed by the automotive lamp 1 according to the first embodiment. FIG. 4 specifically shows a visible light distribution pattern formed on a virtual vertical screen placed at a predetermined position in front of the lamp, for example, at a point 25 meters ahead of the lamp. The scan tracks of the laser light are shown schematically in FIG. 4. The scanning unit 300 can scan a rectangular scan area SA, which extends in the vehicle width direction, with the laser light. When a scanning position of laser light by the scanning unit 300 is within a low beam distribution pattern Lo, the light source control unit 410 has each of the first laser light source 102 to the fourth laser light source 108 emit the laser light. When the scanning position thereof is outside the low beam distribution pattern Lo, the light source control unit 410 stops the emission of the laser light from each of the first laser light source 102 to the third laser light source 106. This forms the low beam distribution pattern Lo having a cutoff line CL1 on the side of an oncoming traffic lane, a cutoff line CL2 on the side of a driver's own lane and a sloping cutoff line CL3. Note that the automotive lamp 1 can also form other light distribution patterns such as a high beam distribution pattern.

(Control Unit)

FIG. 5 is a functional block diagram for explaining a control unit. It will be obvious to those skilled in the art that the functional blocks shown in FIG. 5 may be implemented by a variety of manners including hardware only, software only or a combination of both. The control unit 400 includes a lamp ECU (Electronic Control Unit) 402, a ROM 404, a RAM 406, and so forth. The lamp ECU 402 includes the actuator control unit 408 and the light source control unit 410 (control unit). The ROM 404 stores various control programs. The RAM 406 is used for data storage and used as a work area for the programs executed by the lamp ECU 402. The lamp ECU 402 selectively executes a plurality of programs, stored in the ROM 404, as appropriate, and generates various control signals.

The actuator control unit 408 controls the scanning actuator 320 of the scanning unit 300 and the supporting actuator 10b of the protrusion 10. The light source control unit 410 controls the emission of laser light from the first laser light source 102 to the fourth laser light source 108, independently of each other. For example, the lamp ECU 402 is capable of receiving the signals sent from a light switch 508 provided in the vehicle. When the lamp ECU 402 receives, from the light switch 508, a signal with which to instruct the lamp ECU 402 to turn on and off the automotive lamp 1, the light source control unit 410 controls the turning on and off of each laser light source. A detailed description will be given later of the control performed by the light source control unit 410.

Also, the lamp ECU 402 is capable of receiving the signals sent from the abnormality determining unit 140 of the monitoring unit 130. The light source control unit 410 generates a control signal, which is used to regulate the output of each laser light source, using the signals fed from the monitoring unit 130. Also, the lamp ECU 402 is capable of sending an operation command signal to a broadcasting unit 500 that broadcasts an abnormality in the output of light source(s). The broadcasting unit 500 may be configured by a warning lamp (indicator lamp) or the like provided in the vehicle, for instance.

The lamp ECU 402 is capable of receiving the signals sent from a navigation system 506, a vehicle speed sensor 510, a steering sensor 512 (steering angle sensor) and so forth. Also, the lamp ECU 402 is capable of receiving the signals sent from an image processing apparatus 504, which receives and analyzes image data captured by an on-vehicle camera 502. The on-vehicle camera 502 has sensitivity, namely its detection range, at least in an infrared light region. In the on-vehicle camera 502, at least a front area of a driver's vehicle is contained as an image taking range thereof. And the on-vehicle camera 502 functions as an infrared light detector. The on-vehicle camera 502 is placed on a back side (a frontward side of the vehicle) of an inner rearview mirror, for instance. The on-vehicle camera 502 can acquire an infrared light image of a front area of the vehicle where the infrared laser light IR is reflected.

The image processing apparatus 504 receives the image data fed from the on-vehicle camera 502 and searches for a feature point indicating an obstacle, in the image data. Thereby, the image processing apparatus 504 detects the obstacle existent in a front area of the driver's vehicle. Thus, the fourth laser light source 108, which serves as the infrared light source, the on-vehicle camera 502, which functions as the infrared light detector, and the image processing apparatus 504 constitute an obstacle detector for detecting an obstacle or obstacles in front of the driver's vehicle. In the present embodiment, the scanning unit 300 by which to form a visible light distribution pattern is used for the scanning of the infrared laser light IR. Here, the "obstacle" is meant to be one that obstructs the driving safety of the driver of the vehicle and may include forerunning vehicles, including a vehicle-in-front and an oncoming vehicle, pedestrians, foreign substances such as fallen objects and buildings on the road ahead, and so forth. The image processing apparatus 504 stores beforehand the information on their respective feature points indicative of the forerunning vehicles, the pedestrians, the foreign substances on the rod, so that the type and the position of the obstacle and the distance between the obstacle and the driver's vehicle can be detected.

Figure 6A:
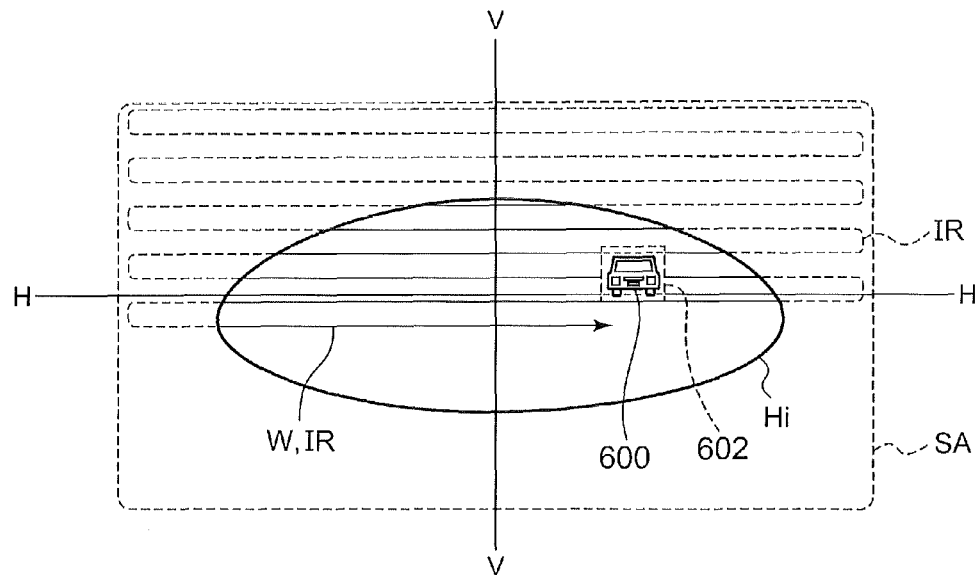
FIG. 6A and FIG. 6B are each a pattern diagram for explaining a laser light irradiation control performed by an automotive lamp according to a first embodiment.
Figure 6B:
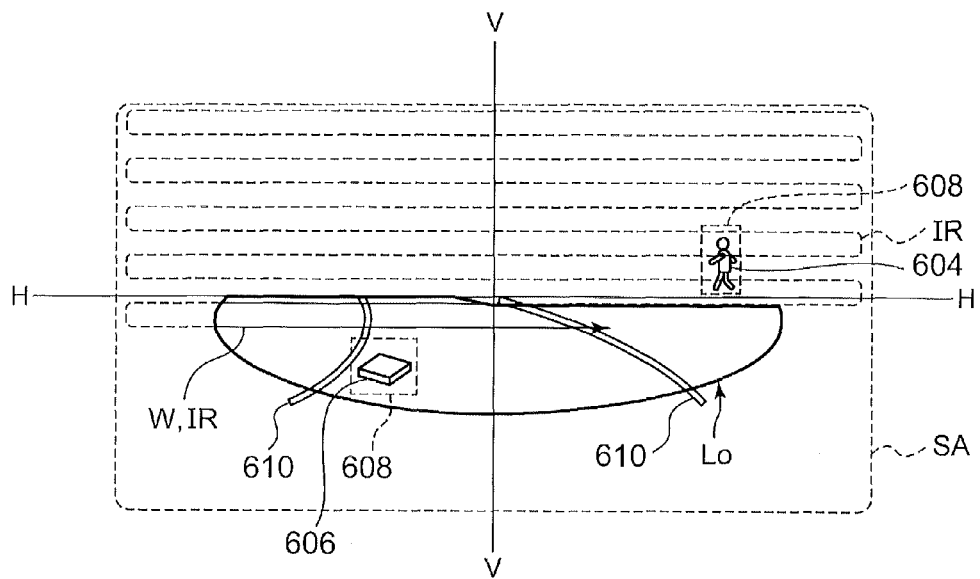

A description is now given of a laser light irradiation control performed by the automotive lamp 1 configured as above. FIG. 6A and FIG. 6B are each a pattern diagram for explaining the laser light irradiation control performed by the automotive lamp 1 according to the first embodiment. FIG. 6A shows a state in which the automotive lamp 1 forms a high beam distribution pattern Hi, and FIG. 6B shows a state in which the automotive lamp 1 forms a low beam distribution pattern Lo. In the automotive lamp 1 according to the present embodiment, the light source control unit 410 adjusts the intensity of the white laser light W irradiated to a region, where the detected obstacle is existent, based on a detection result of the obstacle detector. In other words, the light source control unit 410 grasps (keeps the track of) the road conditions in front of his/her driving vehicle, by the obstacle detector and then controls the output of the white laser light W according to the thus grasped road conditions.

Suppose, for example, that as shown in FIG. 6A, a forerunning vehicle 600 is detected, as an obstacle, within an illuminated region of a visible light distribution pattern being formed (the high beam distribution pattern Hi in FIG. 6A). Then, the light source control unit 410 lowers the intensity of the white laser light W, which is irradiated when the existent region of the forerunning vehicle 600 is scanned, than an initial setting value, namely the intensity thereof irradiated when the visible light distribution pattern is normally formed. For example, the light source control unit 410 sets the intensity of the white laser light W to "0", namely turns off the first laser light source 102 to the third laser light source 106, in the existent region of the forerunning vehicle 600. This forms a non-illuminated region 602 in the existent region of the forerunning vehicle 600 within the high beam distribution pattern Hi. As a result, the glare as experienced by the driver of the forerunning vehicle 600 can be significantly reduced.

Also, suppose that, as shown in FIG. 6B, a pedestrian 604 or a foreign substance 606 is detected as an obstacle. Then, the light source control unit 410 increases the intensity of the white laser light W, which is irradiated when the existent region of the pedestrian 604 or foreign substance 606 is scanned, more than the initial setting value. When, for example, the pedestrian 604 is detected in a region outside the illuminated region (the low beam distribution pattern Lo in FIG. 6B), the light source control unit 410 turns on the first laser light source 102 to the third laser light source 106, in the existent region of the pedestrian 604 so as to irradiate the white laser light W. This forms an intensely illuminated region 608 in the existent region of the pedestrian 604. The intensity of the white laser light W in this intensely-illuminated region 608 may be an intensity exceeding that of the white laser light W forming the low beam distribution pattern Lo or an intensity lower than or equal to that of the white laser light W forming the low beam distribution pattern Lo.

Also, suppose that, for example, the foreign substance 606 is detected within an illuminated region of the low beam distribution pattern Lo. Then, the light source control unit 410 increases the intensity of the white laser light W, which is irradiated when the existent region of the foreign substance 606 is scanned, more than that used when the low beam distribution pattern Lo is formed. This forms an intensely-illuminated region 608 in the existent region of the foreign substance 606. As a result, the visibility of the driver of the vehicle relative to the pedestrian 604 and the foreign substance 606 can be improved.

Also, the light source control unit 410 may control the output of each laser light source such that a light distribution pattern used to support the driving of the vehicle by the driver according to a surrounding environment of his/her driving vehicle. When, for example, the surrounding environment of his/her driving vehicle is in a condition where the visibility drops due to the occurrence of togs or the like, the light source control unit 410 supports the driver by forming a drive guidance light distribution pattern 610. The drive guidance light distribution pattern 610 is, for example, a linear pattern formed along the road shape in a front area of the driver's vehicle. The driver can perceive the road shape in the front area of the driver's vehicle by the drive guidance light distribution pattern 610. Note that the light source control unit 410 can perceive the road shape in the front area of the driver's vehicle by use of information acquired from the navigation system 506, for instance. Also, the light source control unit 410 can perceive the occurrence of fogs by receiving a signal with which to instruct to turn on fog lamps from the light switch 508. The information acquired from the vehicle speed sensor 510 and/or the steering sensor 512 can also be used to perceive the surrounding environment of his/her driving vehicle.

The light source control unit 410 may adjust the intensity of the white laser light W according to the distance between the driver's vehicle and the obstacle. If, for example, the distance from the driver's vehicle to the obstacle is at a predetermined close range, it is comparatively easy for the driver to visually recognize the obstacle. Thus, the light source control unit 410 relatively reduces the intensity of the white laser light W. If, on the other hand, the distance from the driver's vehicle to the obstacle is at a predetermined long range, it is comparatively not easy for the driver to visually recognize the obstacle. Thus, the light source control unit 410 relatively increases the intensity of the white laser light W. In other words, if the obstacle is located at the predetermined close range, the intensity of the white laser light W will be reduced over the case where the obstacle is located at the predetermined long range. Or alternatively, if the obstacle is located at the predetermined close range, the intensity of the white laser light W may be set to a value lower than the initial setting value; if the obstacle is located at the predetermined long range, the intensity thereof may be set to a value higher than the initial setting value. This can help improve the visibility of the driver to the obstacle, reduce the power consumed by the automotive lamp, and make the life of the automotive lamp longer. The aforementioned "predetermined close range" and "predetermined long range" can be set as appropriate by a designer through experiments and simulation runs.

The light source control unit 410 may form, for example, a pattern having a predetermined shape, such as a lattice-like (grid) pattern, on a road surface with the infrared laser light IR. In this case, the road shape or landform in front of the driver's vehicle and an obstacle on the road surface can be detected using a degree of distortion found in this pattern.

As described above, the automotive lamp 1 according to the present embodiment comprises the first laser light source 102 to the third laser light source 106 and the scanning unit 300, which scans the red laser light R, the green laser light G and the blue laser light B emitted from these laser light sources 102 to 106 so as to form the visible light distribution pattern. The automotive lamp 1 further comprises the obstacle detector for detecting an obstacle or obstacles in front of the driver's vehicle and the light source control unit 410, which adjusts the intensity of the laser light irradiated to the existent region of the obstacle(s), based on a detection result of the obstacle detector. This helps improve the visibility of the driver of the vehicle to the pedestrians, fallen objects, buildings and so forth present in front of driver's vehicle and also helps reduce the glare as experienced by other drivers. Hence, the performance of the automotive lamp 1 can be improved.

In the automotive lamp 1 according to the present embodiment, the obstacle detector includes the fourth laser light source 108, which serves as the infrared light source, and the on-vehicle camera 502, which functions as the infrared light detector. The scanning unit 300 scans not only the visible laser light forming the visible light distribution pattern but also the infrared light. In other words, the scanning unit 300 for forming the visible light distribution pattern is used as part of the obstacle detector. Thus, provision of such an obstacle detector can suppress the increase in the manufacturing cost and the number of components required by the automotive lamp 1 and also can prevent the automotive lamp 1 from becoming larger in size.

Second Embodiment

The structure of an automotive lamp according to a second embodiment is basically the same as that of the automotive lamp 1 according to the first embodiment except for how the irradiation of laser lights is controlled by the light source control unit 410. The same structural components as those of the first embodiment are given the same reference numerals and the repeated description thereof and its representation by figures will be omitted as appropriate.

Figure 7A:
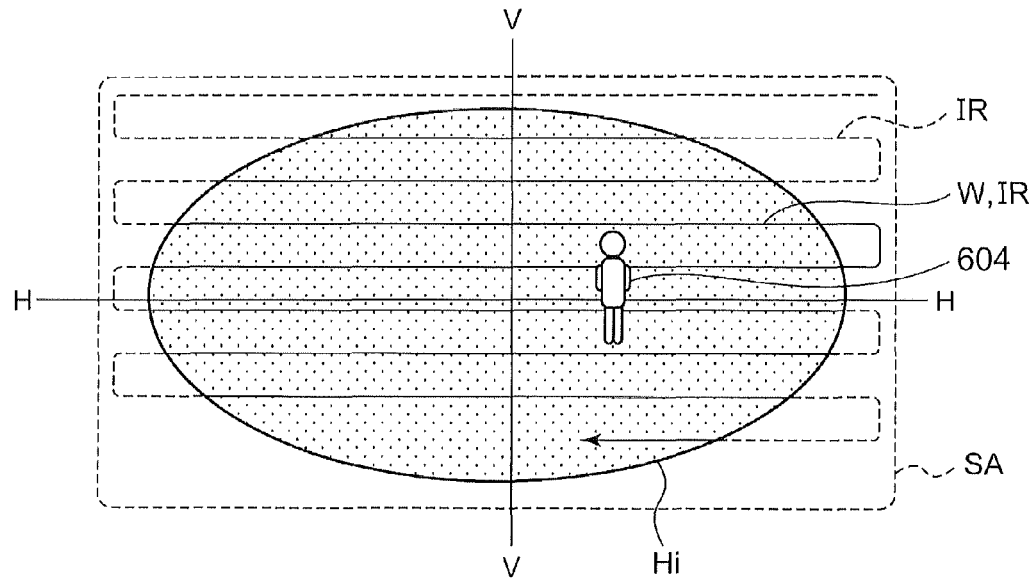
FIG. 7A and FIG. 7B are each a pattern diagram for explaining a laser light irradiation control performed by an automotive lamp according to a second embodiment.
Figure 7B:
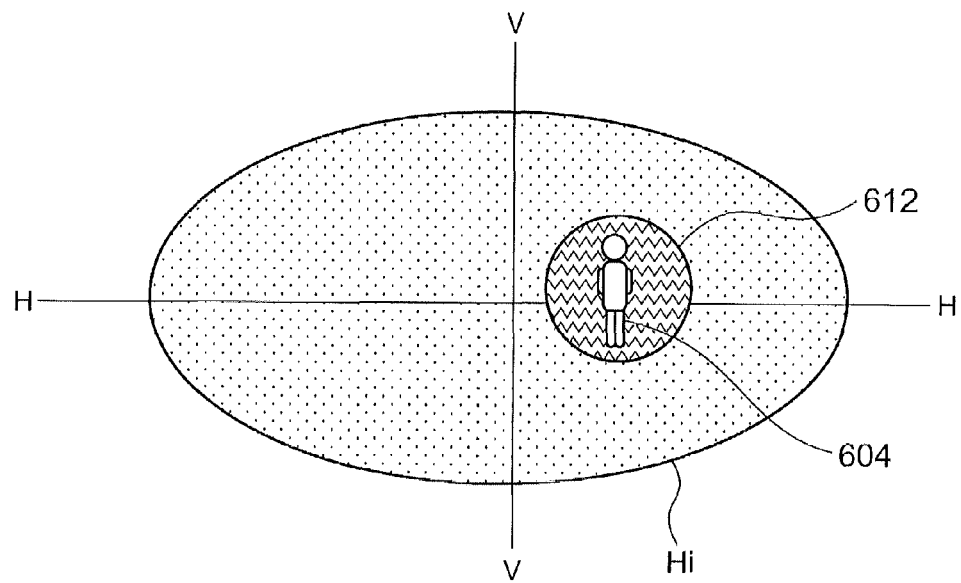

FIG. 7A and FIG. 7B are each a pattern diagram for explaining a laser light irradiation control performed by an automotive lamp according to the second embodiment. FIG. 7A and FIG. 7B each shows a state in which the automotive lamp 1 forms a high beam distribution pattern Hi. In FIG. 7B, the depiction of the scan area SA and the scan tracks of the laser light is omitted. In order that an obstacle can be detected by the obstacle detector with a high degree of accuracy, conceivable is that the scan area SA in its entirety is scanned with the infrared laser light IR having a predetermined high intensity. In such a conceivable case, however, there is a problem of the increased power consumption and the shortened life of the fourth laser light source 108. In the light of this problem, the automotive lamp 1 according to the second embodiment is controlled as follows. That is, as shown in FIG. 7A, the light source control unit 410 first sets the intensity of the infrared laser light IR to a predetermined low intensity and then the scanning unit 300 scan the entire scan area SA with the infrared laser light IR having this low intensity. Hereinafter, this scanning process is called a first scan. The first scan is repeatedly carried out at predetermined intervals.

Now suppose that, for example, the pedestrian 604 is detected by the image processing apparatus 504 from the images obtained by the first scan (or based on the information on some frames obtained before the first scan). Then, as shown in FIG. 7B, the light source control unit 410 sets the intensity of the infrared laser light IR, which is irradiated when the existent region of the pedestrian 604 is scanned, to a predetermined high intensity that is higher than that in the first scan. This forms an intensely-IR-illuminated region 612 in the existent region of the pedestrian 604. Also, as for the region excluding the existent region of the pedestrian 604, the fourth laser light source 108 is turned off. Hereinafter, this scanning process is called a second scan if applicable.

In other words, the light source control unit 410 scans the entire scan area SA with a relatively weak infrared laser light IR and carries out the first scan whereby an obstacle is detected with a relatively low degree of accuracy. Then, as the obstacle is detected by the first scan, the second scan is carried out whereby the scanning range of the infrared laser light IR is limited to an obstacle existent region and, at the same time, a more intense infrared laser light IR is irradiated and the obstacle is detected with a higher degree of accuracy. This can help achieve a highly accurate detection of the object, reduce the power consumed by the automotive lamp, and make the life of the fourth laser light source 108 longer. The aforementioned "predetermined low intensity" and "predetermined high intensity" can be set as appropriate by the designer through experiments and simulation runs.

The control unit 400 may broadcast the presence of an obstacle to the driver in a manner such that the positional information on the obstacle obtained by the second scan is displayed on a display (not shown) installed in the vehicle. Also, in the second scan, the region other than the obstacle existent region may be scanned with the infrared laser light having the predetermined low intensity. In other words, while the entire scan area SA is being scanned with the infrared laser light having the low intensity, the intensity of the infrared laser light IR may be increased only when the obstacle existent region is scanned.

Third Embodiment

The structure of an automotive lamp 1 according to a third embodiment is basically the same as that of the automotive lamp 1 according to the first embodiment except for how the irradiation of laser lights is controlled by the light source control unit 410. The same structural components as those of the first embodiment are given the same reference numerals and the repeated description thereof and its representation by figures will be omitted as appropriate.

Figure 8A:
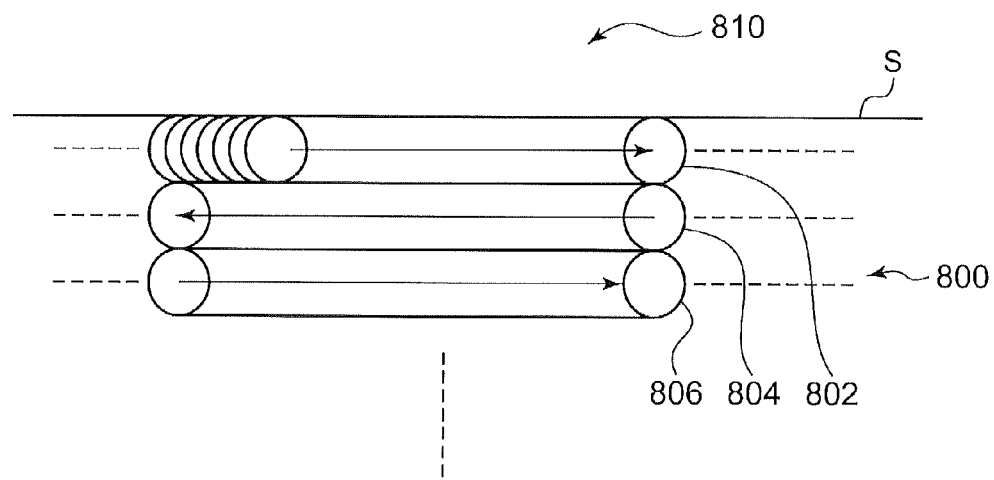
FIG. 8A and FIG. 8B are each a pattern diagram for explaining a laser light irradiation control performed by an automotive lamp according to a third embodiment.
Figure 8B:
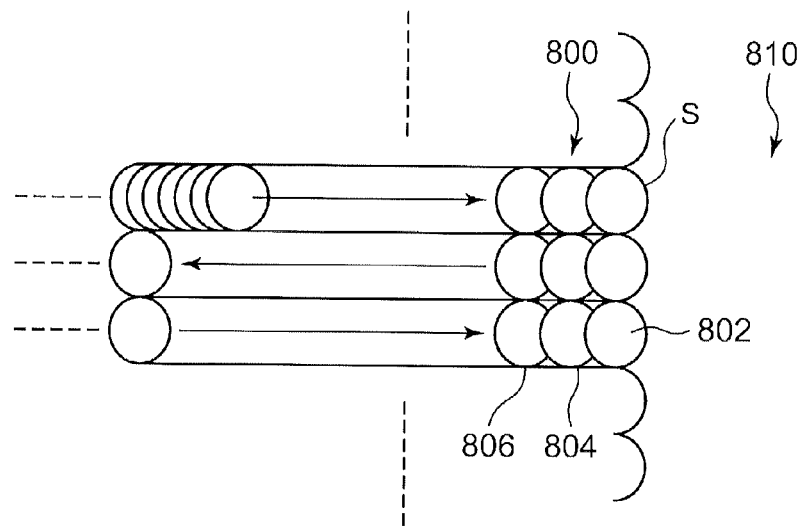

FIG. 8A and FIG. 8B are each a pattern diagram for explaining a laser light irradiation control performed by an automotive lamp according to the third embodiment. FIG. 8A and FIG. 8B are each an enlarged view showing schematically a neighborhood of periphery of visible light distribution pattern. In FIG. 8A, an illuminated region 800 and a non-illuminated region 810 are arranged side by side, vertically. In FIG. 8B, the illuminated region 800 and the non-illuminated region 810 are arranged side by side, horizontally.

Where the visible light distribution pattern is formed by the illumination of the white laser light W, a sharp change in illuminance occurs at a light-dark boundary line S between the illuminated region 800 and the non-illuminated region 810 of the visible light distribution pattern. The sharp change in illuminance at the light-dark boundary line S may have possibly given a visual sense of discomfort to the driver of the vehicle, the drivers of other vehicles, pedestrians and so forth. In consideration of this problem, in the automotive lamp 1 according to the third embodiment, the light source control unit 410 reduces the intensity of the white laser light W irradiated to a periphery of the visible light distribution pattern over the intensity thereof irradiated to a central part of the visible light distribution pattern. This can ease the change in illuminance at the light-dark boundary line S of the visible light distribution pattern, so that the visual sense of discomfort as experienced by the drivers and the pedestrians can be reduced.

For example, as shown in FIG. 8A and FIG. 8B, in the neighborhood of the light-dark boundary line S, the intensity of the white laser light W, which is irradiated when a peripheral-illuminated region 802, an intermediate-illuminated region 804 and a central-illuminated region 806, respectively, are scanned, is set such that the intensity thereof is weaker as the illuminated region is closer to the light-dark boundary line S. Thereby, if, for example, the illuminance in the central-illuminated region 806 is used as a benchmark, the illuminances will be set such that the illuminance of the intermediate-illuminated region 804 is 50% of that of the central-illuminated region 806 and such that the illuminance of the peripheral-illuminated region 802 is 10% of that of the central-illuminated region 806. Here, the peripheral-illuminated region 802 is in contact with (adjacent to) the light-dark boundary line S, the intermediate-illuminated region 804 is in contact with the peripheral-illuminated region 802, and the central-illuminated region 806 is in contact with the intermediate-illuminated region 804. In this manner, the illuminance of the visible light distribution pattern is changed in stages or continuously from the illuminated region 800 toward the non-illuminated region 810. As a result, the visual sense of discomfort as experienced by the drivers and so forth can be further reduced. Provision of the intermediate-illuminated region 804 contributes to a significant reduction in the visual sense of discomfort. However, the effect of reducing the visual sense of discomfort can be achieved to a certain degree if at least the illuminance of the peripheral-illuminated region 802 is reduced to be less than that of the central-illuminated region 806.

The light source control unit 410 may adjust the chromaticity of the white laser light W when the peripheral-illuminated region 802 is scanned. For example, there are cases where a chromatic aberration in the fifth lens 120 causes a color (e.g., blue) to be generated near the light-dark boundary line S of the visible light distribution pattern. Thus, when the peripheral-illuminated region 802 is scanned, the light source control unit 410 reduces the intensity of the blue laser light B by lowering the output of the third laser light source 106. In other words, the ratio of the blue laser light B in the white laser light W is varied. This allows the color of the visible light distribution pattern near the light-dark boundary line S to be the same as that of the central region. As a result, the visibility of the driver can be improved and the sense of discomfort as experienced by the drivers and the pedestrians can be reduced.

Fourth Embodiment

The structure of an automotive lamp 1 according to a fourth embodiment is basically the same as that of the automotive lamp 1 according to the first embodiment except for a method for scanning the laser light. The same structural components as those of the first embodiment are given the same reference numerals and the repeated description thereof and its representation by figures will be omitted as appropriate.

Figure 9A:
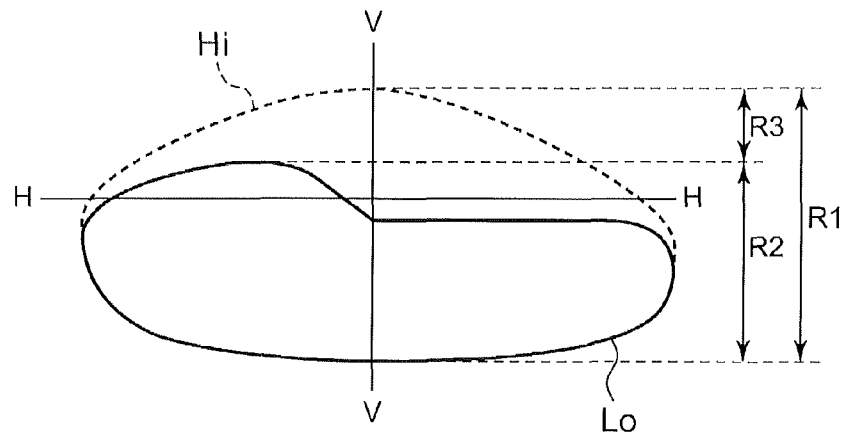
FIG. 9A to FIG. 9C are each a pattern diagram for explaining a laser light irradiation control performed by an automotive lamp according to a fourth embodiment.
Figure 9B:
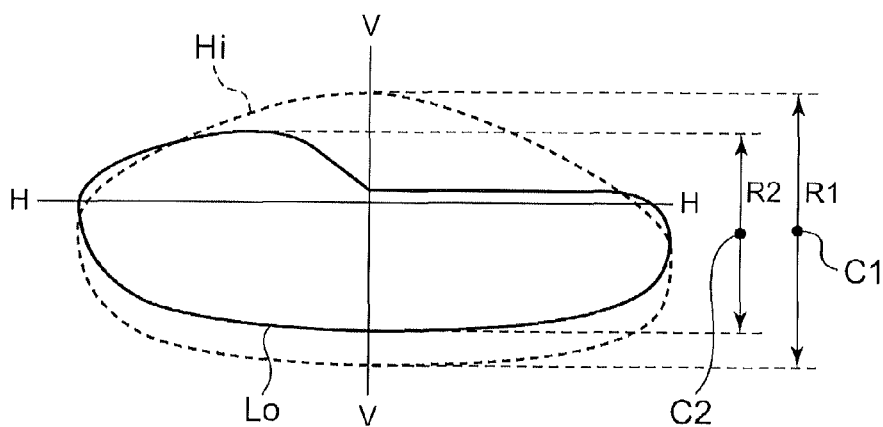
Figure 9C:
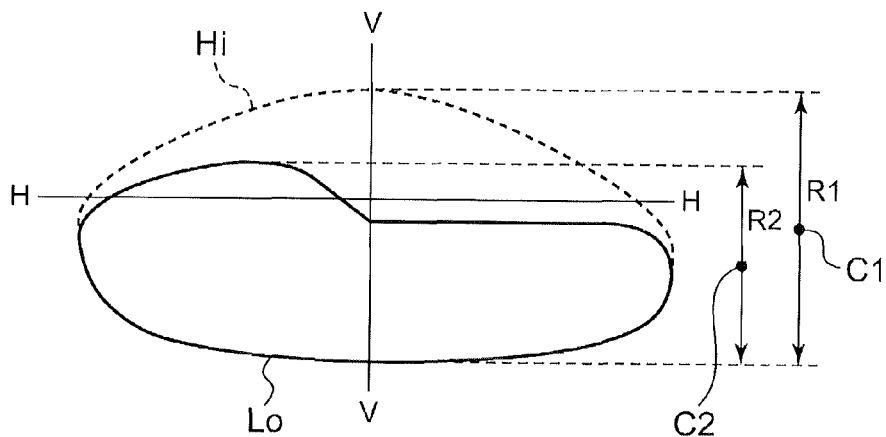

FIG. 9A to FIG. 9C are each a pattern diagram for explaining a laser light irradiation control performed by an automotive lamp according to the fourth embodiment. FIG. 9A shows a difference in the scanning ranges of the white laser light W in between the low beam distribution pattern Lo and the high beam distribution pattern Hi. FIG. 9B shows a positional relationship between the high beam distribution pattern Hi and the low beam distribution pattern Lo, when the low beam distribution pattern Lo is formed by varying only the amplitude of the reflector 318 in the vertical direction. FIG. 9C shows a positional relationship between the high beam distribution pattern Hi and the low beam distribution pattern Lo, when the low beam distribution pattern Lo is formed by varying the amplitude of the reflector 318 in the vertical direction and varying the inclination angle of the reflector 318.

If normally a front area of a vehicle is scanned with the white laser light so as to form a visible light distribution pattern, the amplitude of the reflector by the scanning unit is set such that at least the maximum illuminated region of the visible light distribution pattern can be scanned with the white laser light W. For example, as shown in FIG. 9A, a width R1 of the high beam distribution pattern Hi in the vertical direction is larger than a width R2 of the low beam distribution pattern Lo in the vertical direction, and the high beam distribution pattern Hi has a region, whose width is R3, which does not overlap with the low beam distribution pattern Lo. The width of the reflector 318 in the vertical direction is set such that at least an area in the range of the width R1 can be scanned with the white laser light W.

Thus, the actuator control unit 408 turns the reflector 318 in the vertical direction within the width R1, when the low beam distribution pattern Lo is to be formed, too. When the reflector 318 is positioned at an angle where the white laser light W is reflected within the range of the width R2, the light source control unit 410 turns on the first laser light source 102 to the third laser light source 106 so as to have the white laser light W emitted. When the reflector 318 is positioned at an angle where the white laser light W is reflected within the range of the width R3, the light source control unit 410 turns off each laser light source. Thus, the reflector 318 is wastefully turned in an area covering the range of the width R3 in forming the low beam distribution pattern Lo.

In consideration of such a problem, conceivable is that the width of the reflector 318 in the vertical direction is narrowed down in accordance with the width R2 in forming the low beam distribution pattern Lo. This allows the intervals, at which the illuminated region of the low beam distribution pattern Lo is irradiated with the white laser light W, to be narrowed. Hence, the illuminance of the low beam distribution pattern Lo can be increased. Or the output of the laser light source in the formation of the low beam distribution pattern Lo can be reduced, thereby helping reduce the power consumed by the automotive lamp and make the life of the laser light source longer.

However, as shown in FIG. 9B, simply narrowing the amplitude of the reflector 318 in the vertical direction keeps an amplitude center C2 of the reflector 318 in the vertical direction in forming the low beam distribution pattern Lo, coincident with an amplitude center C1 of the reflector 318 in the vertical direction in forming the high beam distribution pattern Hi. As a result, the amplitude center C2 is shifted upward relative to a center of the low beam distribution pattern Lo in the vertical direction, which is the position where it should be formed. Thus, forming the low beam distribution pattern Lo while the amplitude of the reflector 318 in the vertical direction is simply narrowed makes it shift upward relative to the position where the low beam distribution pattern Lo should be formed in the first place.

In the light of this, as shown in FIG. 9C, when the low beam distribution pattern Lo is to be formed, the amplitude center C2 of the reflector 318 is shifted downward so that the amplitude center C2 thereof can be brought close, along the vertical direction, to the center of the low beam distribution pattern Lo in the vertical direction. In other words, the actuator control unit 408 narrows the amplitude of the reflector 318 in the vertical direction in accordance with the width R2 than when the high beam distribution pattern Hi is formed. And the actuator control unit 408 adjusts the inclination angle (pitch angle) of the reflector 318 in the vertical direction by driving the supporting actuator 10b and thereby shifts the amplitude center C2 downward relative to the amplitude center C1. This enables the center of the low beam distribution pattern Lo in the vertical direction, which is in the position where it should be formed in the first place, to be matched with the amplitude center C2. Thus, the low beam distribution pattern Lo can be formed in an appropriate position.

The actuator control unit 408 can perceive or monitor the formation of the low beam distribution pattern Lo by using the signals received from the light switch 508. The high beam distribution pattern Hi is an example of light distribution patterns where the vertical width is relatively large. The low beam distribution pattern Lo is an example of light distribution patterns where the vertical width is relatively small. The light distribution patterns whose relative vertical width is large and those whose relative vertical width is smaller are not limited to the high beam distribution pattern Hi and the low beam distribution pattern Lo, respectively.

The present invention is not limited to each of the above-described embodiments only, and those resulting from any combination of the embodiments are effective as embodiments. Also, it is understood by those skilled in the art that various modifications such as changes in design may be added to each of the embodiments based on their knowledge and newly combined embodiments or embodiments added with such modifications are also within the scope of the present invention. Any new embodiments resulting from the combination of any two or more of the above-described embodiments or the combination of any of the above-described embodiments with any of the following modifications has each an advantageous effect enjoyed by each of the original embodiment and modification as well.

Although, in the above-described first embodiment, the entire scan area SA is scanned with the infrared laser light IR, only the non-illuminated region of the visible light distribution pattern may be irradiated with the infrared laser light IR. In the illuminated region of the visible light distribution pattern, the obstacle is illuminated by the visible light distribution pattern and therefore the driver can easily see the obstacle. Thus, the non-illuminated region alone in the visible light distribution pattern may be irradiated with the infrared laser light IR. This can help improve the visibility of the driver, reduce the power consumption and make the life of the fourth laser light source 108 longer. The automotive lamp 1 may install an ultraviolet light source in place of or in addition to the infrared light source, as an invisible light source, and may form the visible light distribution pattern and, at the same time, scan an ultraviolet light UV as an invisible light. When the obstacle is detected, the automotive lamp 1 may, for example, display the positional information and the like on the detected obstacle on a display installed in the vehicle so as to broadcast the presence of the obstacle to the driver, in place of or in addition to the formation of the non-illuminated region 602 and intensely-illuminated region 608.

What is claimed is:

1. An automotive lamp system comprising:
   a laser light source;
   a scanning unit that scans laser light emitted from the laser light source and forms a visible light distribution pattern;
   an obstacle detector that detects an obstacle in front of a driver's vehicle; and
   a control unit that adjusts intensity of the laser light irradiated to a region where the obstacle detected by the obstacle detector is existent, wherein the control unit performs control such that the intensity of the laser light irradiated to a periphery of the visible light distribution pattern is less than the intensity thereof irradiated to a central part of the visible light distribution pattern.

2. The automotive lamp system according to claim 1, wherein the obstacle detector has an infrared light source and an infrared light detector, and
   wherein the scanning unit scans the laser light and infrared light emitted from the infrared light source.

3. The automotive lamp system according to claim 1, wherein the control unit relatively reduces the intensity of the laser light irradiated to the region where the detected obstacle is existent if the distance from the driver's vehicle to the detected obstacle is relatively small, and relatively increases the intensity if the distance is relatively large.

* * * * *